Sept. 29, 1970  IWAO AMADA ET AL  3,530,646
APPARATUS FOR CONTINUOUSLY PACKING ARTICLES INTO CONTAINER
Filed March 18, 1968
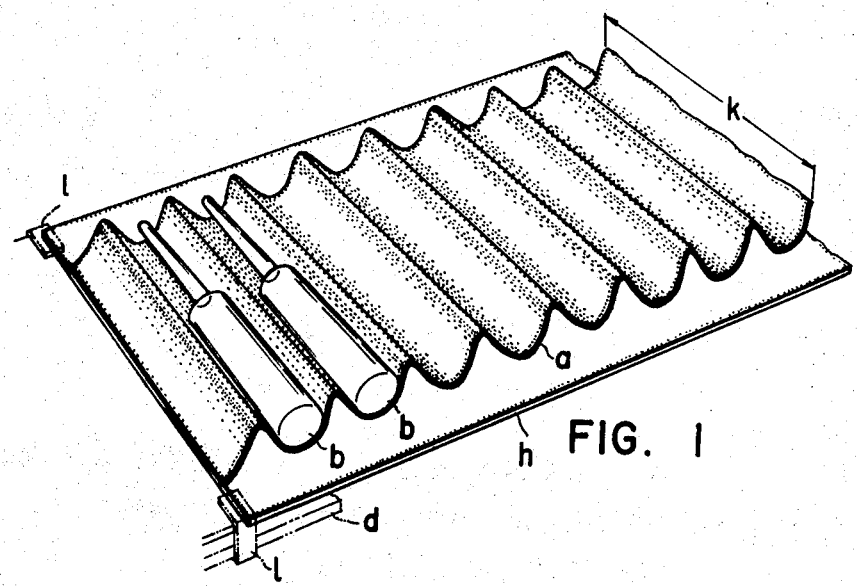
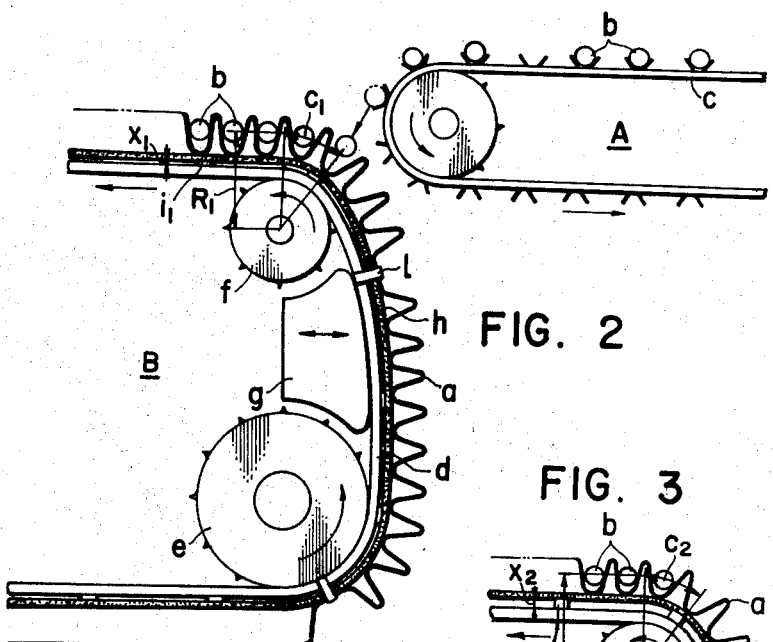
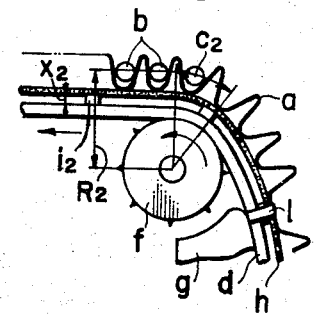
IWAO AMADA,
IKUJI INOWAKI AND  INVENTORS
SHUN-ICHI UCHINO
BY Wanderoth, Lind & Ponack.
ATTORNEYS United States Patent Office 3,530,646
Patented Sept. 29, 1970

3,530,646
APPARATUS FOR CONTINUOUSLY PACKING
ARTICLES INTO CONTAINER
Iwao Amada, Ikuji Inowaki, and Shin-ichi Uchino,
Saitam, Japan, assignors to Eisai Kabushiki Kaisha,
Tokyo, Japan
Filed Mar. 18, 1968, Ser. No. 713,870
Claims priority, application Japan, Mar. 23, 1967,
42/17,645
Int. Cl. B65b 5/04, 19/34
U.S. Cl. 53—236                                 4 Claims

ABSTRACT OF THE DISCLOSURE

An apparatus is disclosed for continuously packing articles into a container with corrugations of the size for holding a plurality of articles of a given size. A first endless conveyor having means thereon for supporting articles to be packed at regular intervals thereon has a path changing from horizontal to a vertically downward direction. A second endless conveyor has a fixed circular length and has means thereon for carrying a container with a series of corrugations secured to the second conveyor with a gap between the bottom surface of the container and the external surface of the conveyor and with the corrugations opening outwardly away from the second endless conveyor. A region of at least a portion of the length of the second conveyor is curved in an arcuate shape and is below the point of the shift in the path of the first endless conveyor so that the articles dropped in succession from the first conveyor fall into the corrugations of the container on the second conveyor, which corrugations are spread apart as the second conveyor moves along the arcuately curved region. Means are operatively associated with said second conveyor for changing the size of the radii of the arcuate portion of the second endless conveyor.

---

This invention relates to a method of continuously packing articles of various types into containers of the same size.

The invention will be more fully understood by reference to the accompanying drawings wherein FIG. 1 is a partial perspective view showing articles, for example ampoules, continuously packed in a container, for example a corrugated case, by the method of the invention; FIG. 2 is a diagrammatic side view of an arrangement adapted for packing ampoules into a container as shown in FIG. 1 according to the method of the invention; and FIG. 3 is a partial view of a modification of the diagrammatic arrangement of FIG. 2, in which the support pieces or gaskets are added to the arrangement.

The container, the corrugated case $a$, shown in FIG. 1, is of certain size and is provided with a plurality of regular furrows as desired for continuously packing sealed articles $b$ such as ampoules. The dimensions of the corrugations, that is, the depth and width of the furrows and the distance between each pair of adjacent ridges may vary depending upon the size and shape of the various articles, for example ampoules, to be packed.

Accordingly, when a continuous packing apparatus as shown in FIG. 2 is employed, it has hitherto been the practice to match the speed of the supplying conveyor $c$ of the unit A and the speed of the conveyor $d$ of the receiving unit B to the size of the container, for example a corrugated case, before each packing operation, so that the articles supplied by the unit A can be dropped without fail in succession into the hollows of a container, for example a corrugated case, which is secured to the unit B. The adjustment is not only very cumbersome but makes the operation intermittent and hence inefficient.

The present invention relates to an improved method for the adjustment of such speeds. According to the method of the invention, unlike the conventional technique, the speed of the supplying conveyor A is kept constant in relation to the other operations such as filling, sealing, printing, labelling, etc. for the articles of predetermined size and shape to be supplied onto the conveyor and, at the same time, the speed of the receiving unit B is also kept constant. In this case, the conveyor speeds of the units A and B may be independent and different from each other. At any rate, in order for the articles supplied at regular intervals by the unit A to drop or fall in succession into the furrows of the container, for example a corrugated case, secured to the unit B, an adjustment must be so made as to keep the point to which the articles drop always within a furrow, or within the distance between a pair of adjacent ridges, of a corrugated case of whatever size. The present invention is characterized by achieving this adjustment simply and accurately by either (A) shifting the position of a guide $g$ interposed between constant-speed driving means $e$ and $f$ of the unit B suitably in either of the directions indicated by arrows to change the radius (R) of the arc of the conveyor $d$ supported by the guide $g$ thereby changing the surface velocity of the arcuate portion of the conveyor $d$, or (B) holdng the guide $g$ fixed and interposing support pieces or gaskets $i_1$ or $i_2$ having a certain thickness $x$ between the arcuate outer surface of the conveyor $d$ and the base $h$ of a corrugated case of a given size secured thereto, or (C) combining (A) the change of the radius (R) with (B) the interposition of support pieces or gaskets of a certain thickness, thereby changing the circumferential speed of the arc formed by the adjoined bottoms or the furrows of the container. More precisely, if the support pieces $i_1$ having the thickness $x_1$ in FIG. 2 are replaced by the thicker pieces $i_2$ having the thickness $x_2$ as shown in FIG. 3, there exist the following relations:

$$R_1 < R_2 \text{ and } c_1 < c_2$$

wheren $R_1$ is the length of the radius between the center of the driving wheel $f$ and the middle point of the depth of furrows of the corrugated case in FIG. 2, and $R_2$ is the length of the radius between the center of the driving wheel $f$ and the middle point of the depth of furrows of the corrugated case in FIG. 3; and $c_1$ and $c_2$ are the lengths of the arcuate lines between corresponding points on successive corrugations travelling at a given angular velocity of the conveyor $d$. Thus, according to the method of the invention, it is easily possible to match the bottoms (furrows) of a container, for example a corrugated case, of given dimensions accurately with the point where the articles being supplied are dropped, without adjusting or otherwise changing the driving speeds of the supplying conveyor A and/or the receiving conveyor B which are running at constant speeds independent of each other. The sag or tension of the conveyor $d$ which results from the displacement of the guide $g$ in either direction is taken up or relieved suitably by shifting the positions of rolls (not shown) which support the conveyor $d$ or, alternatively, increasing or decreasing the distance between the driving means $e$ and $f$. The width at the ends ($k$ in FIG. 1) of a container, for example a corrugated case, of given dimensions to which the method of the invention is applicable is such that, when such case is secured with the ridges adjacent to one another to the conveyor $d$ with the aid of fasteners (1 in FIG. 2), the distances between the sides of each fastener 1 and the adjacent ridges are made equal. Also, in order that the articles on the supplying conveyor A be kept in a certain spaced relationship, the conveyor $c$ is provided with partitioning means on the surface thereof. In operation, the articles are not placed in partitioning means such that they would drop on the fasteners 1 by which the container such as the corrugated case is secured to the conveyor $d$ of the unit B. The conveyor $d$ of the unit B in FIG. 2 may be either a belt or a sprocket chain. In the case where the conveyor $d$ might slip due to a shift in the conveying direction at an acute angle around the driving wheel $f$, it may advantageously be a sprocket chain. If the wheel $f$ used has a relatively small diameter, the opening of each furrow of the corrugated case on the corner of the conveyor may be somewhat increased as shown so that the article dropped down to the furrow can be received without fail. If desired, rollers may be interposed between the contacting faces of the guide member $g$ and the conveyor $d$.

What we claim is:

1. An apparatus for continuously packing articles into a container wth corrugatons of the size for holding a plurality of articles of a given size, comprising a first endless conveyor having means thereon for supporting articles to be packed at regular intervals thereon, the path of said first conveyor changing from horizontal to a vertically downward direction, driving means coupled to said first conveyor for driving said first conveyor at a constant speed, a second endless conveyor having a fixed circular length and having means thereon for carrying a container with a series of corrugations secured to the second conveyor with a gap between the bottom surface of the container and the external surface of the conveyor and with the corrugations opening outwardly away from the second endless conveyor, and further driving means coupled to said second endless conveyor for driving it at a constant speed independent of the speed of said first conveyor, a region of at least a portion of the length of the second conveyor being curved in an arcuate shape and being below the point of the shift in the path of the first endless conveyor so that the articles dropped in succession from the first conveyor fall into the corrugations of the container on the second conveyor, which corrugations are spread apart as the second conveyor moves along the arcuately curved region.

2. An apparatus as claimed in claim 1 further comprising means operatively associated with said second conveyor for changing the size of the radii of the arcuate portion of the second endless conveyor.

3. An apparatus as claimed in claim 2 in which said means for changing the radii comprise supporting pieces, gaskets or spacers having a suitable thickness attached to the second conveyor between the bottom of the container and the conveyor.

4. An apparatus as claimed in claim 3 in which said means for changing the radii comprise a guide which supports the arcuate portion of the second endless conveyor, said guide being movable transversely of the arcuate portion, and said second conveyor further having at least one driving wheel which is shiftable to compensate for the shifting of the guide.

References Cited

UNITED STATES PATENTS 2,846,830  8/1958  Bossi _____ 53—246 XR

FOREIGN PATENTS 199,565  9/1958  Austria.
600,495  12/1959  Italy.

TRAVIS S. McGEHEE, Primary Examiner

R. L. SPRUILL, Assistant Examiner

U.S. Cl. X.R.

53—246, 250